Nov. 7, 1967  J. L. PARK ETAL  3,351,398

COMBINATION ROLLER AND BALL RADIAL BEARING

Filed Sept. 1, 1965

INVENTORS.
JERALD L. PARK
NORMAND L. LAGASSE

ATTORNEYS.

15 # United States Patent Office 3,351,398
Patented Nov. 7, 1967

3,351,398
COMBINATION ROLLER AND BALL
RADIAL BEARING
Jerald L. Park, Stratford, and Normand L. Lagasse,
Bridgeport, Conn., assignors to Avco Corporation,
Stratford, Conn., a corporation of Delaware
Filed Sept. 1, 1965, Ser. No. 484,176
4 Claims. (Cl. 308—177)

ABSTRACT OF THE DISCLOSURE

A bearing for a shaft is provided with an inner race and an outer race. A combination roller and ball bearing is provided by grinding a cylindrical surface onto a ball bearing. The inner race is designed for supporting the roller portion of the bearing while the outer race is split and is designed for supporting the ball portion of the bearing. The split outer race is spring biased to eliminate tolerances.

This invention relates to a combination roller and ball bearing which combines the axial freedom of roller bearings with the stability and speed capability of ball bearings.

Generally, the bearing of this invention utilizes antifriction elements which consist of balls having a ground cylindrical diameter. The cylindrical portion of each antifriction element constitutes a roller which rolls on a roller bearing-type inner race, while the spherical portions of each element roll on a split ball bearing-type outer race. The split outer races are preloaded in accordance with the particular environmental parameters, including thermal growth, radial bearing load, and centrifugal forces resulting from race speed. This combination of a roller bearing and a ball bearing allows axial motion as in a roller bearing, while at the same time it keeps all rolling elements in contact with both races, resulting in less roller bearing-type scoring damage and in improved load distribution as compared with conventional roller bearings. In addition, the ball bearing portions of the antifriction element, in combination with the preloaded split races, reduce shaft radial freedom since the internal clearance is always zero.

It is the object of this invention to provide a bearing utilizing as the antifriction element the combination of a ball and a roller.

Another object of this invention is to provide a bearing having the combined advantages of a roller bearing and ball bearing.

Figure 1:
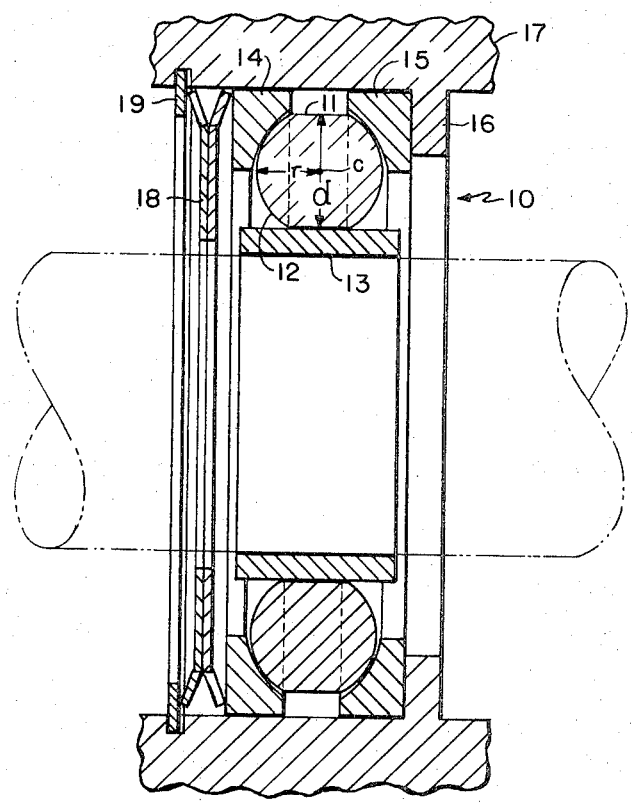
Figure 2:
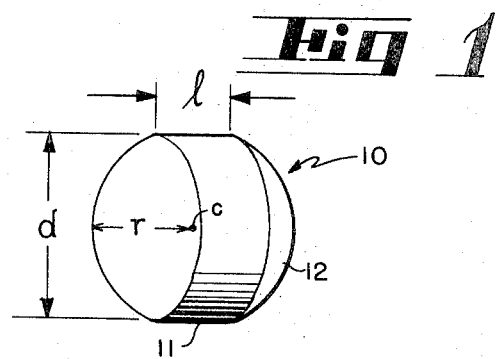

For a better understanding of the invention and for further objects and advantages, reference should now be made to the following detailed specification and to the accompanying drawings in which:

FIGURE 1 is a cross-sectional view of a preferred embodiment of this invention; and FIGURE 2 is a perspective view of an antifriction element used in accordance with this invention.

Referring to the drawings, the numeral 10 indicates the antifriction element used in accordance with this invention. Generally, it consists of a sphere having a center $c$ and a radius $r$. The surface of the sphere is ground to produce a cylindrical surface 11 having a diameter $d$ and a length $l$. The cylindrical surface 11 constitutes a roller track, while the unground surfaces of the sphere constitute the ball portions 12 of the antifriction element 10.

A plurality of such antifriction elements 10 are mounted between an inner race 13 and a split outer race comprising outer race sections 14 and 15. The outer race sections are retained between a flange 16 within a housing 17 and thrust load springs 18 maintained by a snap ring 19.

The cylindrical or roller surface 11 of the antifriction element rolls on the inner race 13, and the inner race 13 is therefore a conventional roller bearing-type race. That is to say, the inner race 13 has axial freedom with respect to the roller surfaces 11 of the antifriction elements 10. The split outer race sections 14 and 15 are, on the other hand, ball bearing-type races which are preloaded by the springs 18. Because the outer races 14 and 15 are split there is a three-point contact between the races and the antifriction element at all times, and hence there is zero radial tolerance and reduced shaft radial freedom. Thus this bearing combines in a single unit the advantages of the conventional roller bearing with the advantages of the conventional ball bearing.

Various modifications will at once become apparent to persons skilled in the art. For example, while an antifriction element consisting of a combination roller and ball element is most readily constructed from a sphere, it is within the scope of this invention that the radius of each ball surface 12 need not originate at the geometrical center of the element 10. That is to say, the respective surfaces 12 may have separated centers so long as the outer races are appropriately designed to accommodate such centers. For that reason it is intended that the invention be limited only by the scope of the appended claims as read in the light of the prior art.

What is claimed is:

1. A bearing having inner and outer coaxial races, one of said races being a cylindrical roller bearing-type race the other being a split toroidal ball bearing-type race;
   a plurality of antifriction elements rotating between said races, said antifriction elements having a cylindrical surface the ends of which terminate in spherical surfaces, each of said spherical surfaces having its center located on the axis of said cylindrical surface, said cylindrical surface being in contact with said roller bearing-type race, and said spherical surfaces being in contact with and supported between said split ball bearing-type race;
   and means for axially preloading said elements between the surfaces of said split race.

2. The invention as defined in claim 1 wherein the spherical surfaces of said antifriction elements have a common center.

3. The invention as defined in claim 1 wherein said inner race is said cylindrical roller bearing-type race and said outer race is said split toroidal ball bearing-type race 4. The invention as defined in claim 3 wherein the cylindrical surfaces of said antifriction elements have a common center.

References Cited
UNITED STATES PATENTS

| | | | |
|---|---|---|---|
| 1,143,479 | 6/1915 | Abbott | 308—212 |
| 1,226,782 | 5/1917 | Lemieux | 308—196 |

MARTIN P. SCHWADRON, *Primary Examiner.*

FRANK SUSKO, *Examiner.*